United States Patent [19]

Fluegge et al.

[11] Patent Number: 5,386,621
[45] Date of Patent: Feb. 7, 1995

[54] FLEXIBLE ASSEMBLY CELL

[75] Inventors: Jerry H. Fluegge, Manitou Beach; Francis G. King, Bloomfield Hills; William H. Schank, Jr., Howell; Laura P. Olson, Dearborn, all of Mich.

[73] Assignee: Ford Motor Company, Dearborn, Mich.

[21] Appl. No.: 106,739

[22] Filed: Aug. 16, 1993

[51] Int. Cl.$^6$ .............................................. B23P 21/00
[52] U.S. Cl. .................................. 29/705; 29/714; 29/771
[58] Field of Search ............... 29/705, 709, 711, 714, 29/742, 771, 783, 784, 791, 799, 822, 823

[56] References Cited

U.S. PATENT DOCUMENTS

| | | |
|---|---|---|
| 2,757,447 | 8/1956 | Barenyi . |
| 4,503,596 | 3/1985 | Ida et al. . |
| 4,669,168 | 6/1987 | Tamura et al. ................ 29/823 |
| 4,674,181 | 6/1987 | Hamada et al. . |
| 4,738,387 | 4/1988 | Jaufmann et al. . |
| 4,823,062 | 4/1989 | Hoffman et al. . |
| 4,835,424 | 5/1989 | Hoffman et al. . |
| 4,867,595 | 9/1989 | Hoffman . |
| 4,872,257 | 10/1989 | Wakamori et al. ............ 29/714 |
| 4,875,275 | 10/1989 | Hutchinson et al. . |
| 4,890,241 | 12/1989 | Hoffman et al. . |
| 4,984,353 | 1/1991 | Santandrea et al. ........... 29/714 |
| 5,018,266 | 5/1991 | Hutchinson et al. . |
| 5,081,593 | 1/1992 | Pollack . |
| 5,103,555 | 4/1992 | Mizuno et al. . |
| 5,105,534 | 4/1992 | Kautt . |
| 5,126,648 | 6/1992 | Jacobs . |
| 5,136,196 | 8/1992 | Schmidt . |
| 5,138,206 | 8/1992 | Schmidt . |
| 5,150,452 | 9/1992 | Pollack et al. . |
| 5,152,050 | 10/1992 | Kaczmarek et al. . |

FOREIGN PATENT DOCUMENTS

| | | | |
|---|---|---|---|
| 83328 | 5/1982 | Japan | 29/823 |
| 211437 | 12/1982 | Japan | 29/709 |
| 211438 | 12/1982 | Japan | 29/709 |
| 4325 | 1/1983 | Japan | 29/705 |
| 4326 | 1/1983 | Japan | 29/705 |
| 272428 | 11/1988 | Japan | 29/791 |
| 63-295136 | 12/1988 | Japan . | |

*Primary Examiner*—Mark Rosenbaum
*Assistant Examiner*—David P. Bryant
*Attorney, Agent, or Firm*—Roger L. May; Raymond L. Coppiellie

[57] ABSTRACT

A flexible assembly cell is provided for adding a selected one of a plurality of available components to one of at least two different types of motor vehicle subassembly which may be presented. The flexible assembly cell comprises a work station including a platen having at least one head movable thereover, and a conveyor for presenting a subassembly to the work station. An optical scanner is also provided for identifying whether the subassembly is of a first type or a second type. The head moves magnetically over the platen to retrieve one of the first components from the supply of first components if the optical scanner determines that the subassembly is of the first type, or to retrieve one of the second components from the supply of second components if the optical scanner determines that the subassembly is of the second type. After retrieval, the head presents the retrieved component for addition to the subassembly. A method is also provided of adding a selected one of a plurality of available components to one of at least two different types of motor vehicle subassembly which may be presented.

16 Claims, 3 Drawing Sheets

FLEXIBLE ASSEMBLY CELL

TECHNICAL FIELD

This invention relates to assembly lines for manufacturing subassemblies, and more particularly to a flexible assembly cell capable of adding a selected one of a plurality of available components to one of at least two different types of motor vehicle subassembly.

BACKGROUND ART

Conventional assembly lines for producing motor vehicle subassemblies typically include a series of stationary work stations, each of which performs a different operation on the subassembly. While an assembly line of this sort is suitable for mass production of a single type of subassembly, it does not readily accommodate multiple different types of subassembly intended for diverse models of automobile.

Furthermore, the work stations of conventional automobile assembly lines often employ robots having articulated arms. For example, U.S. Pat. No. 4,738,387 to Jaufmann et al. discloses a flexible manufacturing system for the processing and production of semi-finished vehicle body subassemblies which includes articulated robot arms. A disadvantage of using such conventional robots is that the articulated arms require a large swept out area in which to operate, which correspondingly increases the floor space required for the assembly line.

SUMMARY OF THE INVENTION

The present invention is a flexible assembly cell for adding a selected one of a plurality of available components to one of at least two different types of motor vehicle subassembly which may be presented. The flexible assembly cell comprises a work station including a platen having at least one head movable thereover, and conveyor means for presenting a subassembly to the work station. Identification means are also provided for determining whether the subassembly is of a first type or a second type. The head moves magnetically over the platen to retrieve one from a supply of first components if the identification means determines that the subassembly is of the first type, or to retrieve one from a supply of second components if the identification means determines that the subassembly is of the second type. After retrieval, the head presents the retrieved component for addition to the subassembly.

The invention also includes a method, embodied by the apparatus described above, of adding a selected one of a plurality of available components to one of at least two different types of motor vehicle subassembly which may be presented. The method comprises providing a work station including a platen having at least one head movable thereover, and determining whether the subassembly is of a first type or a second type. In response to the identification, the method further comprises moving the head to retrieve one from a supply of first components or to retrieve one from a supply of second components. Finally, the retrieved component is presented for addition to the subassembly.

Accordingly, it is an object of the present invention to provide a flexible assembly cell of the type described above which readily accommodates multiple different types of subassembly intended for diverse models of automobile.

Another object of the present invention is to provide a flexible assembly cell of the type described above which does not require articulated robot arms, and which can be situated in a relatively small floor space area.

Still another object of the present invention is to provide a method of the type described above for manufacturing motor vehicle subassemblies which utilizes heads magnetically movable over a platen instead of articulated robot arms.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
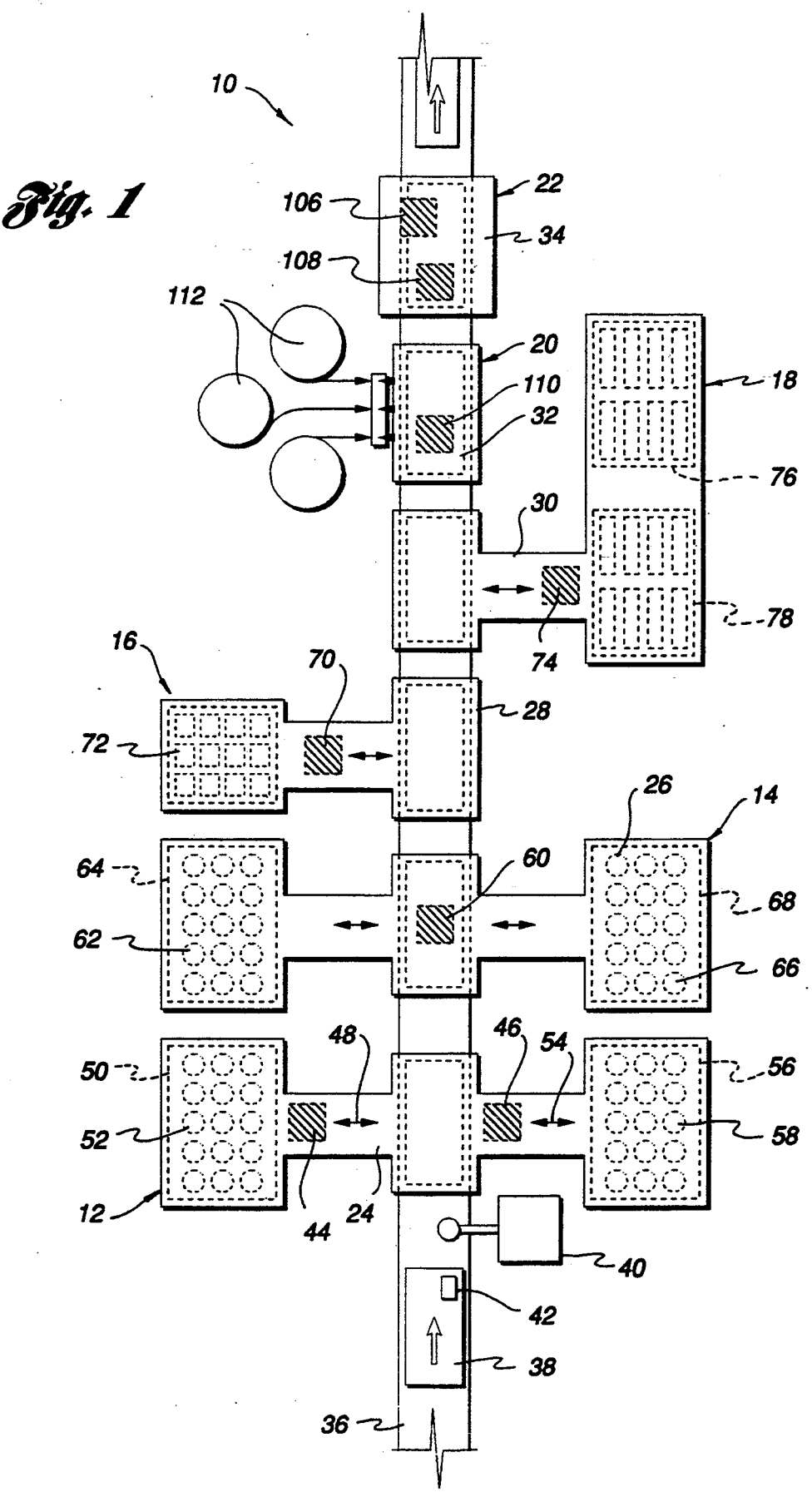
FIG. 1 is a schematic view of a flexible assembly cell according to the present invention including a series of work stations.

With reference to the drawings, the preferred embodiments of the present invention will be described. FIG. 1 shows a flexible assembly cell 10 according to the present invention for adding a selected one of a plurality of available components to one of at least two different types of motor vehicle subassembly which may be presented. The assembly cell 10 comprises work stations 12, 14, 16, 18, 20 and 22 which each respectively include a steel platen 24, 26, 28, 30, 32 and 34 suspended above a conventional transport conveyor belt 36. At least one linear motor is magnetically supported from each platen, and each of the linear motors has a head attached thereto. Both the heads and their associated linear motors are movable over the platens, as described more fully below.

The conveyor belt 36 is situated generally below each of the platens, and functions as a conveyor means for presenting a subassembly 38 to the first work station 12 and thereafter moving the subassembly in a forward direction through the cell 10. As an alternative to or in conjunction with a conventional conveyor belt, other conveyor means such as a large lower platen may be provided to move the subassemblies past the work stations. The subassembly 38 may be intended for inclusion with any of a variety of different motor vehicle models. Identification means are therefore provided at or before the first work station 12, such as an optical scanner 40 adapted to read a bar code 42 affixed to the subassembly 38, for determining for which model the presented subassembly is intended. For example, if the flexible assembly cell 10 is set up to accommodate subassemblies for either of two different automotive models A or B, the identification means determines whether the presented subassembly is of a first type intended for integration with a model A automobile, or of a second type designed for integration with a model B automobile.

At the first work station 12, a pair of heads 44 and 46, including their connected linear motors, are movable over the platen 24. The head 44 moves, preferably by reciprocating linearly along a uniaxial runway 48, between a work position over the conveyor 36 and a position over a parts bin 50 which provides a supply of first components 52 accessible to the head 44. Similarly, the head 46 is linearly reciprocable along an opposite uniaxial runway 54 such that another parts bin 56 disposed on the other side of the conveyor belt 36 provides a supply of second components 58 accessible to the head 46.

If the optical scanner 40 determines from the bar code 42 that the subassembly 38 is of the first type, the head 44 retrieves one of the first components 52 from the supply 50 of first components. If on the other hand the optical scanner 40 determines from the bar code 42 that the subassembly 38 is of the second type, the head 46 retrieves one of the second components 58 from the supply 56 of second components. After retrieval, both heads 44 and 46 are adapted to present the retrieved component for addition to the subassembly 38.

After insertion of either a component 52 or a component 58 onto the subassembly 38, the conveyor 36 takes the subassembly down the line to the second work station 14. At the second work station, a single head 60 moves to retrieve a component 62 from a supply bin 64 if the identification means determines that the subassembly 38 is of the first type, or to retrieve a component 66 from a supply bin 68 if the identification means determines that the subassembly is of the second type. After retrieval, the head 60 presents the retrieved component for addition to the subassembly. The second work station 14 is thus similar in function to the first work station 12, but has a single head which performs the tasks done by the heads 44 and 46 at the first work station.

The third work station 16 also has a single head 70 which is movable over the platen 28. However, the work station 16 is designed to add components common to any type of subassembly. Therefore, the head 70 retrieves a component 72 and presents it to each subassembly 38 traveling therepast, regardless of the model of motor vehicle for which the subassembly is intended. The fourth work station 18 shows still another possible arrangement wherein a single head 74 has access to a supply 76 of first components and a supply 78 of second components disposed on the same side of the conveyer belt 36.

Figure 2:
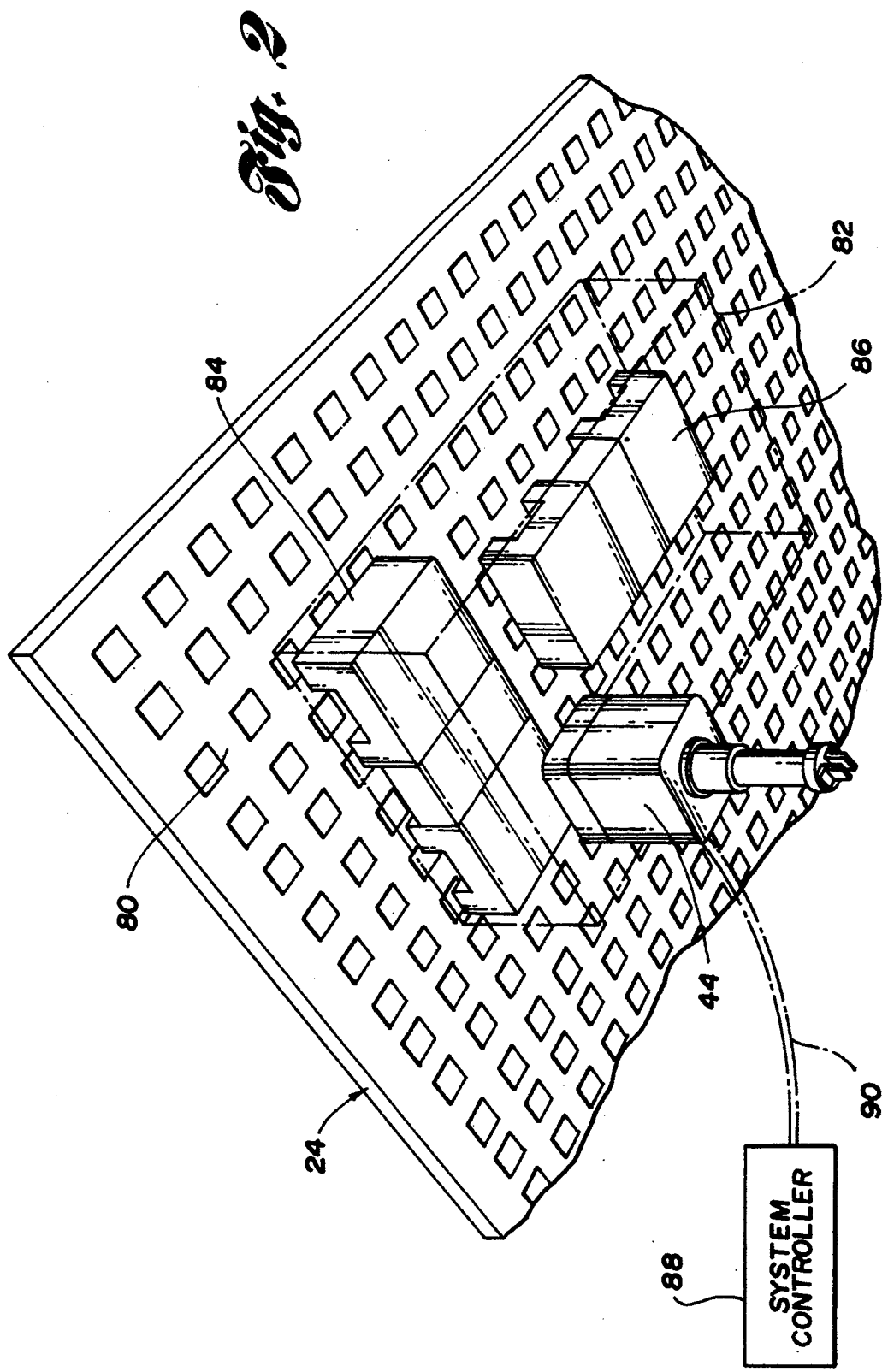
FIG. 2 is a partial perspective view, partially in cross-section, of a platen, linear motor and head of one of the work stations.

FIG. 2 shows a representative portion of one of the platens 24. The platen 24 is photochemically etched or otherwise provided with a Cartesian XY matrix 80 for the electronically switched stepping linear motors 82. When stationary, the linear motors 82 are magnetically held tightly against the platen by magnets 84 and 86. When commanded to move by the software of a system controller 88, a small amount of compressed air is injected into the space between the platen 24 and the base of the linear motor 82 through an umbilical cord 90, as described in U.S. Pat. No. 4,823,062 assigned to Megamation Incorporated and hereby incorporated by reference. Thereafter, the linear motor 82 and its attached head 44 ride across the platen 24 on a frictionless compressed air bearing at varying speeds up to about 100 inches per second, depending on the payload borne by the head and the required production rates. Although the linear motor 82 and the head 44 are shown in an inverted position suspended from the platen 24, it should be understood that any of the platens can be oriented at any advantageous angle, including one in which the linear motors and heads ride on top of a horizontal platen, for example, to perform operations from below the subassemblies traveling past the platen. When the linear motors and heads ride on top of the platen, they are normally capable of carrying greater payloads than when they are suspended from the platen.

Figure 3:
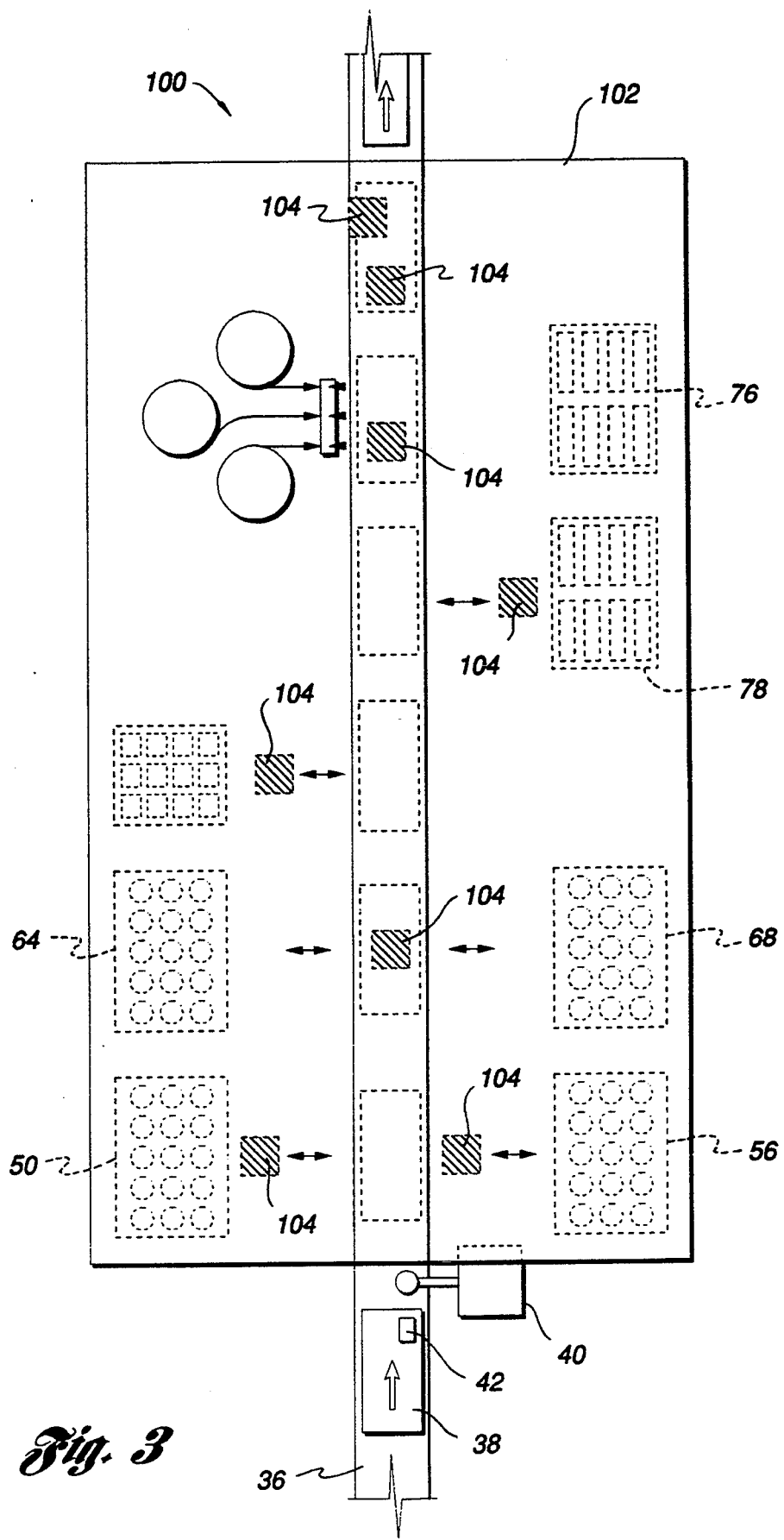
FIG. 3 is a schematic view of an alternative embodiment of the flexible assembly cell having a single platen and multiple linear motors and heads.

FIG. 3 shows an alternative embodiment 100 of the assembly cell having a single large platen 102 with a plurality of linear motors 104. The platen 102 may cover, for example, an area of 8 feet by 10 feet or larger, and carry ten or more linear motors and their associated heads. The heads operate simultaneously on the platen 102. An anti-collision program such as those disclosed in U.S. Pat. Nos. 4,890,241 and 5,150,452, both assigned to Megamation Incorporated and hereby incorporated by reference, ensure that the heads will not interfere with each other during operation.

In either of the embodiments of the present invention, the linear motor heads can be designed strictly to move the retrieved components from one fixed tooling station at the perimeter of the platen to another, or can be designed with optical recognition means and/or tooling attached. For example, the sixth work station 22 (FIG. 1) may be provided with heads 106 and 108 having power drills attached thereto. A separate head 110, for instance one associated with the work station 20, retrieves fasteners such as screws from supply rolls 112, and positions the screws such as in prefabricated holes in a hood latch bracket or a rubber hood slam bumper. The heads 106 and 108 are then positioned so that the power drills engage and tighten the screws, thereby connecting e.g. the hood latch bumper to a radiator support.

The present invention also includes a method, embodied by the devices described above, of adding a selected one of a plurality of available components to one of at least two different types of motor vehicle subassembly which may be presented. The method comprises providing a work station including a platen having at least one head movable thereover, and determining whether the subassembly is of a first type or a second type. The head is then moved to retrieve one from a supply of first components if the identification means determines that the subassembly is of the first type, or to retrieve one from a supply of second components if the identification means determines that the subassembly is of the second type. Finally, the retrieved component is presented for addition to the subassembly. The method can additionally include moving a second head to retrieve third components common to all types of subassembly.

The flexible assembly cell of the present invention is thus readily adaptable to different manufacturing requirements. The individual platens, or pieces of a large platen, are advantageously mounted from overhead gantries so that changes can be effected to the assembly cell in less time than conventional systems. Similarly, a platen can be added to the cell or the existing platens can be reconfigured in a different geometric layout when product and process requirements change. If the task to be performed by particular heads is to be altered, the heads can be homed on the platen and a new operating program implemented by the system controller. Furthermore, the platens can be mounted from the gantry so that they rotate, allowing greater access to the parts. The present invention also provides a space and cost savings in that more assembly lines can be placed in less space than with prior art conventional articulated robotics arms. Also, the individual work stations are more durable than their conventional counterparts because there are no mechanical rails or other hard stops to wear over time.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. A flexible assembly cell for adding a selected one of a plurality of available components to one of at least two different types of motor vehicle subassembly which may be presented, the flexible assembly cell comprising:
   a work station including a platen having a head magnetically mounted thereto and movable thereover;
   a supply of first components accessible to the head;
   a supply of second components accessible to the head;
   conveyor means for presenting a subassembly to the work station; and
   mechanical identification means for determining whether the subassembly is of a first type or a second type;
   the head moving to retrieve one of the first components from the supply of first components if the identification means determines that the subassembly is of the first type or to retrieve one of the second components from the supply of second components if the identification means determines that the subassembly is of the second type, and to present the retrieved component for addition to the subassembly.

2. The flexible assembly cell of claim 1 wherein the platen is situated generally above the conveyor means.

3. The flexible assembly cell of claim 1 wherein the head is movable over the platen on an air bearing.

4. The flexible assembly cell of claim 1 wherein the head is magnetically suspended from the platen.

5. The flexible assembly cell of claim 1 wherein the head is movable by a linear motor.

6. The flexible assembly cell of claim 1 wherein the head is movable along a uniaxial runway.

7. The flexible assembly cell of claim 1 wherein the conveyor means comprises a conveyor belt.

8. The flexible assembly cell of claim 1 wherein the identification means comprises an optical scanner adapted to read a bar code affixed to the subassembly.

9. The flexible assembly cell of claim 1 wherein the supply of first components and the supply of second components are disposed on opposite sides of the conveyor means.

10. The flexible assembly cell of claim 1 wherein the supply of first components and the supply of second components are disposed on the same side of the conveyor means.

11. The flexibly assembly cell of claim 1 further comprising a second work station for adding third components common to all types of subassembly.

12. The flexible assembly cell of claim 1 further comprising a second head, the second head including a tool for performing a manufacturing operation on the subassembly.

13. The flexible assembly cell of claim 1 wherein the first components comprise hood slam bumpers.

14. The flexible assembly cell of claim 1 wherein the second components comprise hood latch brackets.

15. A flexible assembly cell for adding a selected one of a plurality of available components to one of at least two different types of motor vehicle subassembly which may be presented, the assembly cell comprising:
   a work station including a platen having a plurality of linear motors magnetically supported from the platen and movable thereover on an air bearing;
   a plurality of heads, each head being attached to an associated linear motor;
   a supply of first components accessible to a first head;
   a supply of second components accessible to a second head;
   conveyor means situated generally below the platen for presenting a subassembly to the work station; and
   identification means for determining whether the subassembly is of a first type or a second type;
   the first one of the heads being adapted to retrieve one of the first components from the supply of first components if the identification means determines that the subassembly is of the first type, the second one of the heads being adapted to retrieve one of the second components from the supply of second components if the identification means determines that the subassembly is of the second type, and a third one of the heads being adapted to retrieve a common component for addition to either type of subassembly.

16. A flexible assembly cell for adding a selected one of a plurality of available components to one of at least two different types of motor vehicle subassembly which may be presented, the flexible assembly cell comprising:
   a work station including a platen having first and second heads magnetically mounted thereto and movable thereover;
   a supply of first components accessible to the first head;
   a supply of second components accessible to the second head;
   conveyor means for presenting a subassembly to the work station; and
   mechanical identification means for determining whether the subassembly is of a first type or a second type;
   the first head moving to retrieve one of the first components from the supply of first components and to present the retrieved first component for addition to the subassembly if the identification means determines that the subassembly is of the first type, and the second head moving to retrieve one of the second components from the supply of second components and to present the retrieved second component for addition to the subassembly if the identification means determines that the subassembly is of the second type.

* * * * *